(12) United States Patent
Fong et al.

(10) Patent No.: US 6,188,406 B1
(45) Date of Patent: Feb. 13, 2001

(54) SINGLE-ITEM TEXT WINDOW FOR SCROLLING LISTS

(75) Inventors: Bryan Lew Fong, San Diego; Chris Shi-Chai Liu, San Jose, both of CA (US); Kazuto Mugura, Kawasaki (JP)

(73) Assignees: Sony Corporation, Tokyo (JP); Sony Electronics Inc., Park Ridge, NJ (US)

( * ) Notice: Under 35 U.S.C. 154(b), the term of this patent shall be extended for 0 days.

(21) Appl. No.: 09/133,155

(22) Filed: Aug. 12, 1998

(51) Int. Cl.[7] .................................................... G06F 3/14
(52) U.S. Cl. ............................ 345/348; 345/352; 345/341
(58) Field of Search ..................................... 345/348, 352, 345/341, 350, 326, 969; 455/418, 419

(56) References Cited

U.S. PATENT DOCUMENTS

| | | | | |
|---|---|---|---|---|
| 5,396,264 | * | 3/1995 | Falcone et al. ..................... | 345/146 |
| 5,561,709 | * | 10/1996 | Remillard ......................... | 379/93.19 |
| 5,598,523 | * | 1/1997 | Fujita ............................. | 395/352 |
| 5,675,752 | | 10/1997 | Scott et al. . | |
| 5,694,563 | * | 12/1997 | Belfiore et al. .................... | 345/352 |
| 5,708,787 | * | 1/1998 | Nakano et al. ...................... | 345/352 |
| 5,784,059 | * | 7/1998 | Morimoto et al. .................... | 345/353 |
| 5,854,629 | * | 12/1998 | Redpath ........................... | 345/341 |
| 5,923,327 | * | 7/1999 | Smith et al. ....................... | 345/341 |
| 5,926,756 | * | 7/1999 | Piosenka et al. . | |
| 5,943,467 | * | 8/1999 | Beyers et al. ...................... | 386/83 |
| 6,047,197 | * | 4/2000 | Jarrad .............................. | 455/566 |

* cited by examiner

Primary Examiner—Raymond J. Bayerl
Assistant Examiner—Thomas T. Nguyen
(74) Attorney, Agent, or Firm—Ying Tuo; Adam H. Tachner; Crosby, Heafey, Roach & May

(57) ABSTRACT

A typical conventional Graphical User Interface (GUI) displays multiple menu items, together with their respective icons (or symbols), on a display region. However, when a display region has a relatively small area, displaying icons (or symbols) together with their respective menu items makes the display region clustered, thus increasing the difficulty for a user to locate and select a desired menu item. To overcome this shortcoming, an improved GUI displays multiple menu items of a menu on a display region that contains a column window and row window. Each of the menu items contains a content field and a symbol field. The GUI only displays the symbol fields of the menu items that are scrolled into the column window and the content field of a menu item that is scrolled into the row window. In doing so, the improved GUI facilitates a user to select a desired menu item from the menu.

18 Claims, 4 Drawing Sheets

SINGLE-ITEM TEXT WINDOW FOR SCROLLING LISTS

BACKGROUND OF THE INVENTION

1. Field of the Invention

This invention relates generally to displaying a plurality of items on a display region, and, more specifically, to meaningfully displaying a plurality of items on a display region with a relatively small area.

2. Related Art

Graphical User Interfaces (GUIs) are routinely used to provide visual interfaces between applications and users. Displayed in a region on a screen, a GUI provides one or more menus, each containing a plurality of items. By selecting an item from a menu, a user can invoke an application, input parameters for running an application, or invoke a sub menu. Frequently, the items in a menu are text based. Thus, when multiple items are closely listed in a menu, a user needs to take effort and concentration to locate and select a desired item from the menu. To make a GUI more user friendly, a menu often displays icons (or symbols) beside respective textual menu items, so that users have visual aids to locate and select a desired item from the menu. However, when a display region has a relatively small area (such as a LCD screen on a cellular telephone), displaying icons (or symbols) together with their respective menu items makes the display region cluttered, thus increasing the difficulty for a user to locate and select a desired menu item.

There is, therefore, a need for a method and apparatus to provide an improved Graphic User Interface (GUI) for displaying icons (or symbols) together with menu items, without compromising the advantage provided by the icons (or symbols).

The present invention provides a method and apparatus to meet this need.

SUMMARY OF THE INVENTION

To address the shortcomings of the available art, the present invention displays a plurality of items on a display region having a relatively small region, with the feature of facilitating a user to locate and select an item from the display region.

In one aspect, the present provides a method for displaying a plurality of rows of items on a display region, each of the rows containing a content field and a symbol field. The method comprises the steps of: displaying a column window and a row window on the display region; scrolling the plurality of rows over the region, so that a set of symbol fields contained in a set of the plurality of rows are being scrolled into the column window and at least one content field contained in of the plurality of rows is being scrolled into the row window; in the column window, displaying the symbol fields that are scrolled into the column window; and in the row window, displaying at least one content field that is being scrolled into the row window.

The present invention also provides a corresponding apparatus for performing the method discussed above.

The foregoing and other features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENTS

Figures 1A, 1B:
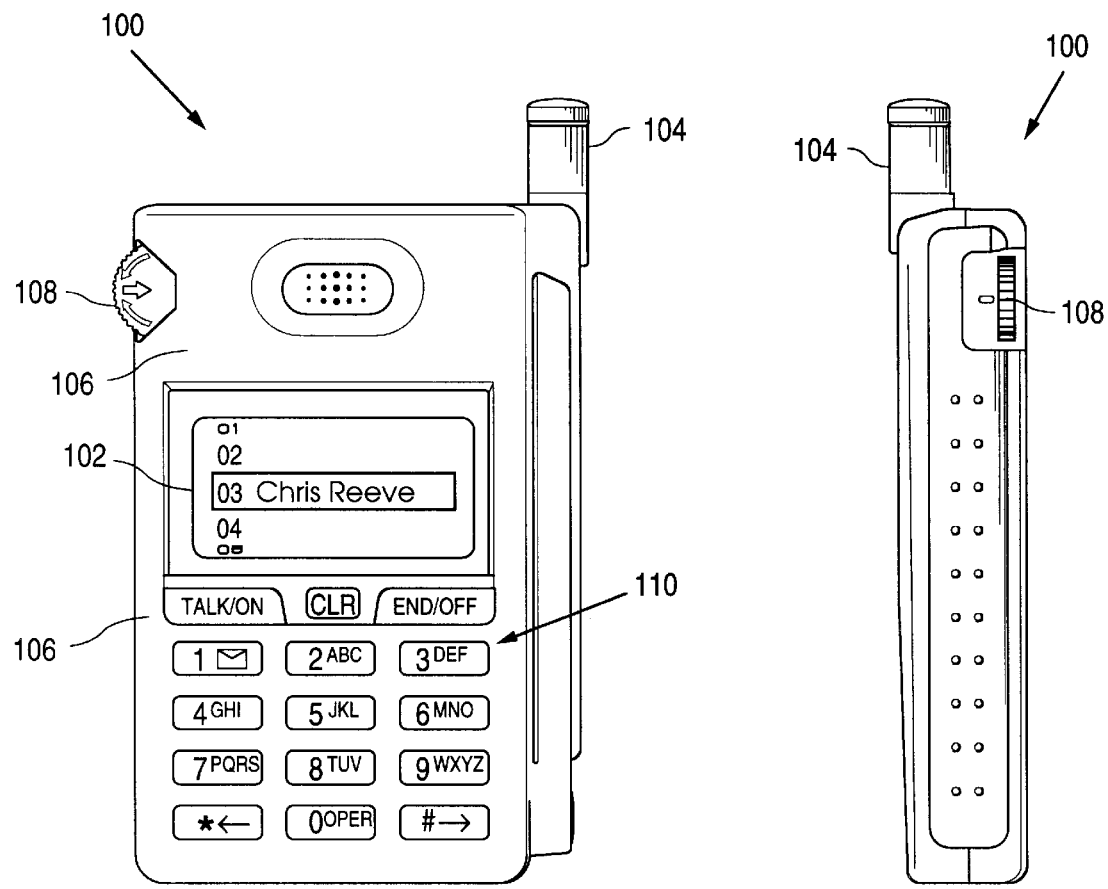
FIG. 1A is the front view of a cellular telephone, which can be used to implement the present invention.
FIG. 1B is the side view of a cellular telephone shown in FIG. 1A.

Referring to FIG. 1A, there is shown the front view of a cellular telephone 100, which can be used to implement the present invention.

As shown in FIG. 1A, the cellular telephone 100 includes a display screen 102, an antenna 104, and a control panel 106. The control panel 106 includes a jog dial wheel 108 and a key panel 110 including twelve alpha/numeric keys (1, 2, 3, 4, 5, 6, 7, 8, 9, *, 0, and #). The jog dial wheel 108 can be moved in three directions (turn-up, turn-down, and press-in) as indicated by the three arrows. The items displayed on the display screen 102 can be scrolled up and down by turning the jog dial wheel 108 up and down, respectively. A selected item displayed on the display screen 102 can be activated by pressing-in the jog dial wheel 102.

Referring to FIG. 1B, there is shown the side view of the cellular telephone 100 to illustrate the side view of the jog dial wheel 108.

Figure 2:
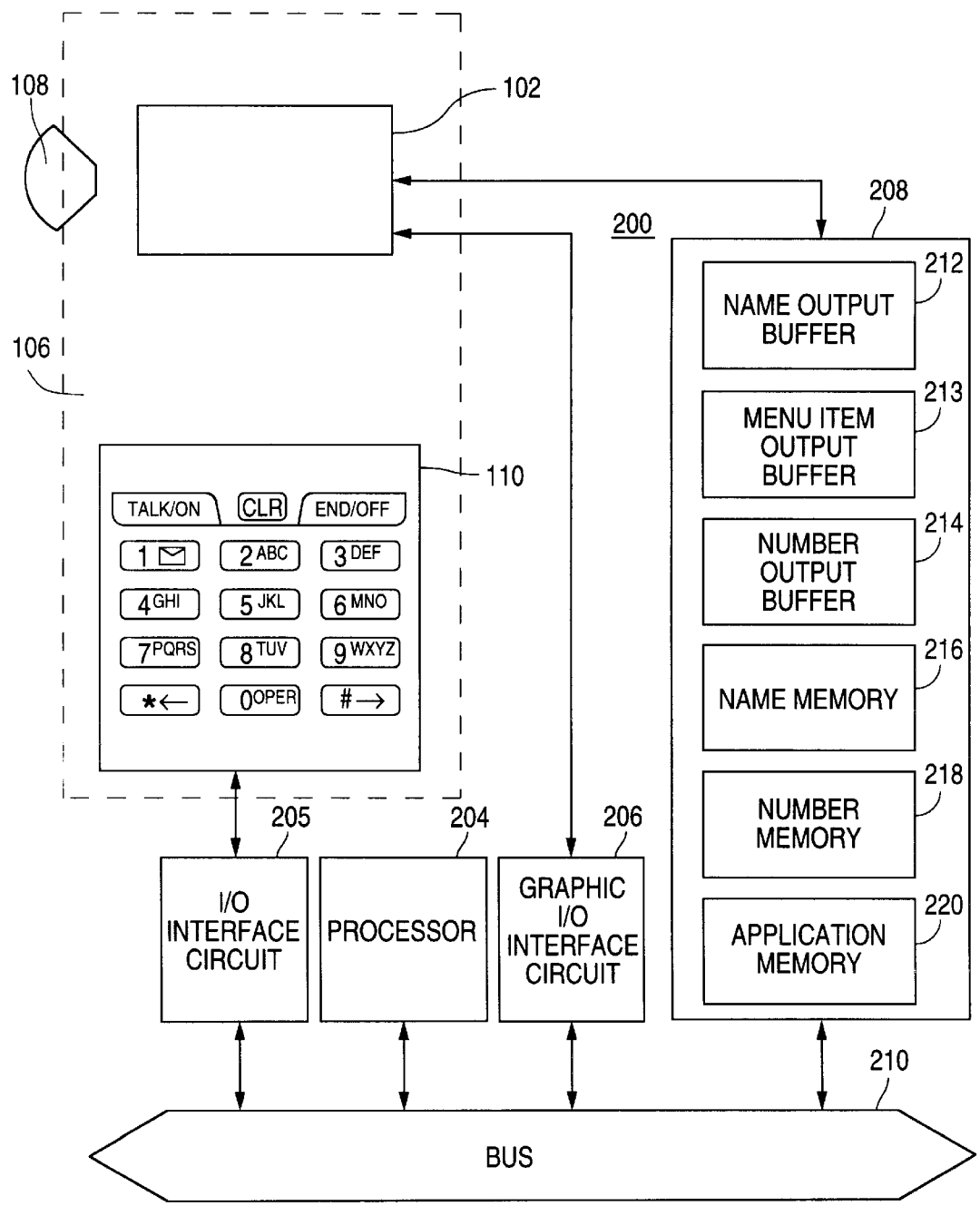
FIG. 2 is a block diagram illustrating some components of the cellular telephone, in accordance with the present invention.

Referring to FIG. 2, there is shown a block diagram 200, illustrating some components of the cellular telephone 100 shown in FIG. 1A, in accordance with the present invention.

As shown in FIG. 2, the block diagram 200 includes a processor 204, an I/O (input and output) interface circuit 205, a graphic I/O interface circuit 206, a memory 208, and a bus 210.

The processor 204, the I/O interface circuit 205, the graphic I/O interface circuit 206, and the memory 208 are all coupled to the bus 210.

The memory 208 includes: (1) a name output buffer 212 for storing telephone directory names to be displayed, (2) a menu item output buffer 213 for storing menu items to be displayed, (3) a number output buffer 214 for storing the telephone numbers to be displayed, (4) a name memory 216 for storing the telephone directory names, (5) a number memory 218 for storing the telephone numbers associated with the telephone directory names, and (6) an application memory 220 for storing an application that includes a data entry routine, a display routine, and a dialing routine.

The processor 204 controls the operations of the I/O interface circuit 205, the graphic the I/O interface circuit 206, the memory 208, and the display region 102. More specifically, the processor 204 is able to: (1) get access to the data stored in the name output buffer 212, the menu item output buffer 213, the number output buffer 214, the name memory 216, and the number memory 218, (2) execute the application stored in the application memory 220, (3) interact with the control panel 106 via the I/O interface circuit 205, and (4) display the data stored in the output buffers 212 and 214 on the display region 102 via the graphic I/O interface circuit 206. All these operations are performed in a conventional manner, except as otherwise described herein.

Since to the cellular system 100, the display region 112 is an output mechanism, the name output buffer 212 and menu item output buffer 213 are especially set to store the data items for the display region 112. Since the display region 112 has a relatively small area, not all the data items stored in the output buffer 212 or the menu item output buffer 213 can be displayed on the display region 112 at a certain point of time. Hence, a start pointer and an end pointer are set to mark an active section for the name output buffer 212 (or the menu item output buffer 213). Even though all the names stored in the output buffer 212 (or the menu items stored in the menu item output buffer 213) are linked with the display region 112, only the names (or the menu items) contained in the active section are proportionally displayed on the display region 112 at a certain point of time. When the start and end pointers move up or down by turning up or down the jog dial wheel 108 on the control panel 106, the active section of the name output buffer 212 (or the menu item output buffer 213) is also being moved up or down, causing the names stored in the output buffer 212 (or the menu items stored in the menu item output buffer 213) to scroll up or down on the displaying region 112 accordingly.

Using the jog dial wheel 108, a user can invoke the data entry routine (stored in the application memory 220). And using the alpha/numeric keys on the key panel 110, a user can input names to the name memory 216 and numbers to the number memory 218. The names and numbers can then be loaded from the name memory 216 and the number memory 218 to the name output buffer 212 and the number output buffer 214, respectively. A name may associate with several numbers. Among the several numbers, the user can define a primary number for the name.

Referring to FIGS. 3–6, there is shown a conceptual scheme of displaying the names contained in the active section of the name output memory 212, in accordance with the present invention.

Figure 3:
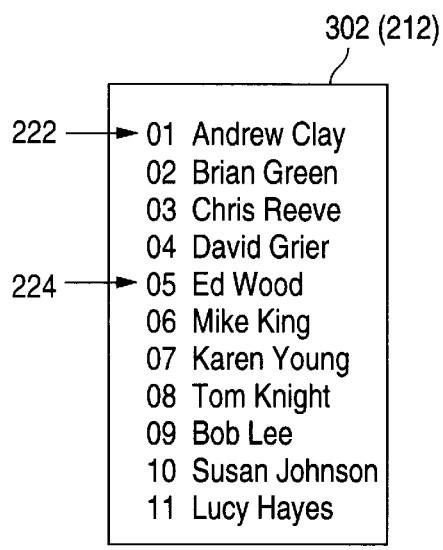
FIGS. 3–6 show a conceptual scheme of displaying the names in a telephone directory and their associated symbols on a display region, in accordance with the present invention.

Conceptually, according to FIG. 3, the name output buffer 212 can be considered as a piece of paper 302, and each of the names stored in the name output buffer 212 can be considered as a line of content written on the paper 302. Thus, all names stored in the name output buffer 212 can be proportionally mapped into the paper 302. Corresponding to the names stored in the name output buffer 212, the paper 302 contains eleven lines, which are divided into a name column, and a line number column. As shown in FIG. 3, a start pointer 222 is set to the first name entry (01 Andrew Clay) and an end point to the fifth name entry (05 Ed Wood), thus marking an active section of the name output buffer 212 containing the first five name entries (01, 02, 03, 04, and 05).

Figure 4:
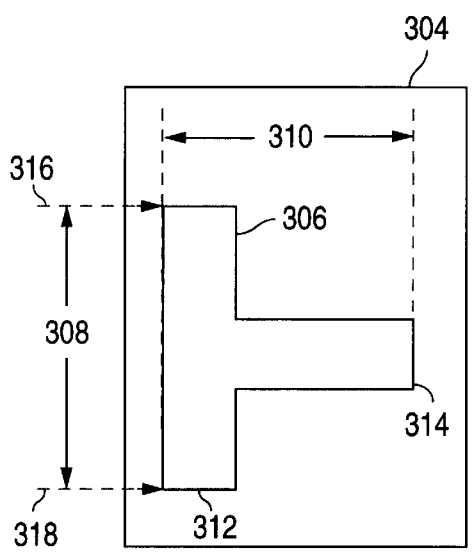

FIG. 4 shows another piece of paper 304 containing a "T" shaped window 306 on it. The "T" shaped window 306 has a height 308 (having a top edge 316 and a bottom edge 318) and a width 310. The active section in the output buffer 212 (shown in FIG. 3) and display region 112 are mapped into the area formed by the height 308 and the width 310. The "T" shaped window 306 also contains a window column 312 and a window row 314. The size of the window row 310 is designed to contain only one content field. The corresponding position relationships between the output buffer 212 and the "T" shaped window 306 are as follows:

(1) the start pointer 222 is mapped with the top edge 316;

(2) the end pointer 224 is mapped with the bottom edge 318;

(3) the rows in the active section of the output buffer 212 are proportionally mapped within the height 308 of the "T" shaped window 306; and (4) the two fields contained in the output buffer 212 are proportionally mapped within width 310 of the "T" shaped window 306.

Figure 5:
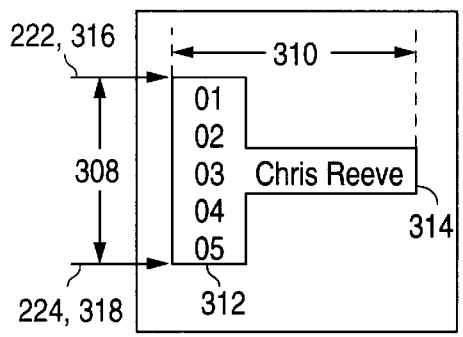

Using the schemes shown in FIGS. 3 and 4, the process of displaying the names contained in the active section of the name output buffer 212 can be demonstrated by placing the paper 304 over the paper 302, as shown in FIG. 5.

Referring to FIG. 5, there is shown a conceptual effect by combining 3 with FIG. 4, in accordance with the present invention.

In the example shown in FIG. 5, it is assumed the start and end pointers 222 and 224 mark an active section in the name output buffer 212 containing the first five names as shown in FIG. 4. As shown in FIG. 5, the window column 312 is lined up with the line number column on the paper 302, the start pointer 222 is lined up with the top edge 316, the end pointer 224 is lined up with the bottom edge 318. Since the paper 304 is considered being placed over the paper 302, only the line numbers scrolled into the window column 312 can be seen, and only the name field scrolled into the window row 314 can be seen.

Figure 6:
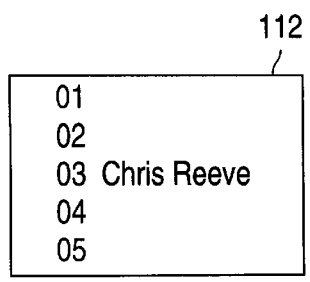

Referring to FIG. 6, there is shown an actual display on the display region 112 illustrating the combining effect of FIGS. 4 and 5. As shown in FIG. 6, the display region 112 only displays the five line number fields (01, 02, 03, 04 and 05) contained in the active section as a column and a name field (Chris Reeve) in its middle row.

In operation, a user can scroll up or down the names (that are stored in the name output buffer 212) on the display region 112 by turning up and turning down the jog dial wheel 108, respectively. In response to the turning up or turning down of the jog dial wheel 108, the control panel 106 sends a request signal to the processor 102 via the I/O circuit 203 and the bus 210. Upon receiving the request signal, the processor 204 executes the display routine (stored in the application memory 220) to move the start and end pointers 222 and 224 up or down. And the active section of the name output buffer 212 is moved up or down accordingly. The processor 204 executes the display routine to periodically update the display on the display region 112 while the start and end pointers are moving up or down, giving the impression that the names are continuously scrolling up or down.

Figure 7:
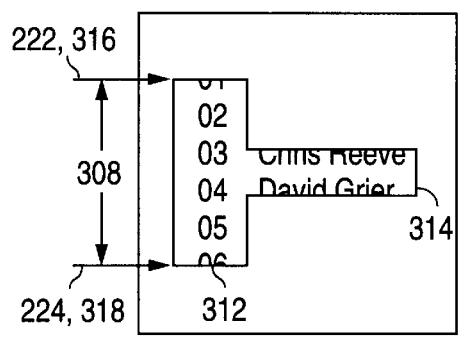
FIGS. 7–9 show a scheme of scrolling the names and their associated symbols on a display region, in accordance with the present invention.
Figure 8:
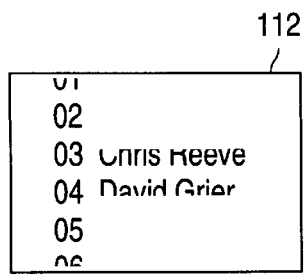
Figure 9:
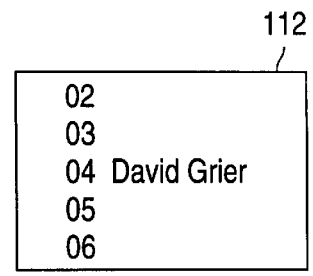

Referring to FIGS. 7–9, there is shown a conceptual scheme of scrolling names on display region 112 in response to the position changes of the start and end pointers 222 and 224, in accordance with the present invention. In the example shown in FIGS. 7–9, it is assumed that the user is turning up the jog dial wheel 108, so that the start pointer 222 is moving from the first name item (01 Andrew Clay) to the second name item (02 Brian Green), and the end pointer 224 is moving from the fifth name item (05 Ed Wood) to the sixth name item (06 Mike King).

As shown in FIG. 7, the start pointer 222 is mapped with the top edge 316, and the end pointer 224 with the bottom edge 218, of the window height 308. Therefore, moving the start pointer and end pointer 222 and 224 down is equivalent to slide the paper 302 up while keeping the paper 304 in a fixed position. Thus, when the start pointer 222 is moving from the first name entry to the second name entry and the end pointer 224 is moving from the fifth name entry to the sixth name entry, the following events will occur on the "T" shaped window 314:

(1) the line field of the first name entry is moving out the column window 312;

(2) the line field of the sixth name entry is moving into the column window 312;

(3) the name field of the third name entry is moving out the row window 314; and (4) the name field of the fourth name entry is moving into the row window 314.

FIG. 8 shows a transitional display on the display region 112, while the start pointer 222 is moving from the first name entry (01 Andrew Clay) to the second name entry (02 Brian Green) and end pointer 224 is moving from the fifth name entry (05 Ed Wood) to the sixth name entry (06 Mike King).

FIG. 9 shows a display on the display region 112, where the fourth name entry (04 David Grier) is moved into the row window 314.

In the name output buffer 302 as shown FIG. 3, each of the names associates with one or more telephone numbers. In operation, a user can activate the name displayed on the display screen 112 by pressing in the jog dial wheel 108. In response to the activation, if the activated name associates with only one telephone number, the processor 204 excuses the dialing routine (stored in the application memory 220) to generate a dial signal to the telephone number; if the activated name associates with a plurality of telephone numbers, the processor 204 excuses the display routine (stored in the application memory 220) to display the telephone number for further selection.

Figure 10:
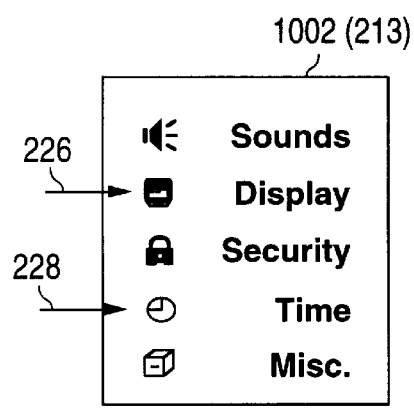
FIGS. 10–12 show a conceptual scheme of displaying the menu items and their associated icons on a display region, in accordance with the present invention.
Figure 11:
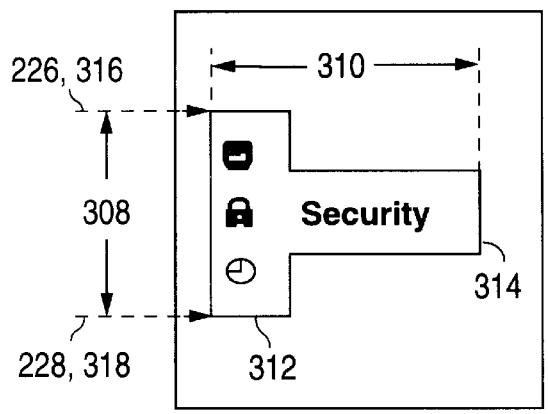
Figure 12:
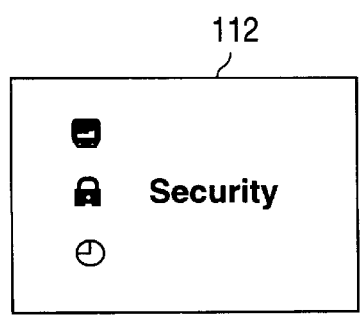

Referring to FIGS. 10–12, there is shown a conceptual scheme of displaying the menu items contained in the active section of the menu item output memory 213, in accordance with the present invention.

Similar to the discussion in connection with FIG. 3, in FIG. 10, the menu item output buffer 213 can be considered as a piece of paper 1002, and each of the menu items stored in the menu item output buffer 213 can be considered as a line of content written on the paper 1002. Thus, all menu items stored in the menu item output buffer 213 can be proportionally mapped into the paper 1002. Corresponding to the menu items stored in the menu item output buffer 213, the paper 1002 contains five lines, which are divided into a menu item column, and an icon column. As shown in FIG. 10, an start pointer 226 is set to the second menu item entry (Display) and an end point to the fourth menu item entry (Timer), thus marking an active section of the menu item output buffer 213 containing three menu item entries (Display, Security, and Timer).

As discussed above, FIG. 4 shows a piece of paper 304 containing a "T" shaped window 306 on it. The corresponding position relationships between the menu item output buffer 213 of FIG. 10 and the "T" shaped window 306 of FIG. 4 are as follows:

(1) the start pointer 226 is mapped with the top edge 316;

(2) the end pointer 228 is mapped with the bottom edge 318;

(3) the rows in the active region of the menu item output buffer 213 are proportionally mapped within the height 308 of the "T" shaped window 306; and (4) the two fields contained in the menu output buffer 213 are proportionally mapped within width 310 of the "T" shaped window 306.

Using the schemes shown in FIGS. 3 and 10, the process of displaying the menu items contained in the active section of the menu item output buffer 213 can be demonstrated by placing the paper 304 over the paper 1102, as shown in FIG. 11.

Referring to FIG. 11, there is shown a conceptual effect by combining FIGS. 4 with 10, in accordance with the present invention.

In the example shown in FIG. 11, it is assumed the start and end pointers 226 and 228 mark an active section in the menu item output buffer 213 containing the three menu items as shown in FIG. 10. As shown in FIG. 11, the window column 312 is lined up with the icon column on the paper 1002, the start pointer 226 is lined up with the top edge 316, the end pointer 228 is lined up with the bottom edge 318. Since the paper 304 is considered being placed over the paper 1002, only the icons scrolled into the window column 312 can be seen, and only the menu item field scrolled into the window row 314 can be seen.

Referring to FIG. 12, there is shown an actual display on the display region 112 illustrating the combining effect of FIGS. 10 and 11. As shown in FIG. 11, the display region 112 only displays the three icon fields contained in the active section as a column and a menu item field (Security) in its middle row.

In operation, a user can scroll up or down the menu items (that are stored in the menu item output buffer 213) on the display region 112 by turning up and turning down the jog dial wheel 108, respectively. In response to the turning up or turning down of the jog dial wheel 108, the control panel 106 sends a request signal to the processor 102 via the I/O circuit 203 and the bus 210. Upon receiving the request signal, the processor 204 executes the display routine (stored in the application memory 220) to move the start and end pointers 226 and 228 up or down. And the active section of the menu item output buffer 213 is moved up or down accordingly. The processor 204 executes the display routine to periodically update the display on the display region 112 while the start and end pointers are moving up or down, giving the impression that the menu items are continuously scrolling up or down.

Figure 13:
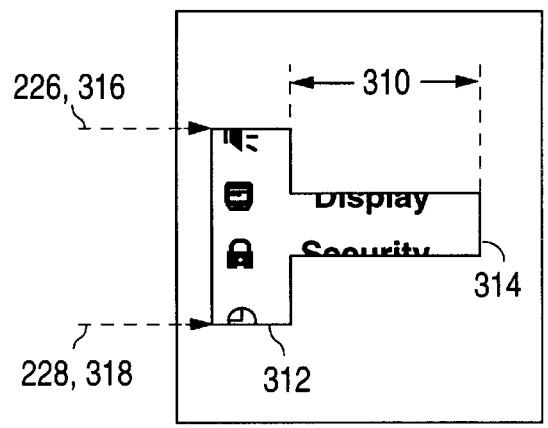
FIGS. 13–15 show a scheme of scrolling the menu items and their associated icons on a display region, in accordance with the present invention.
Figure 14:
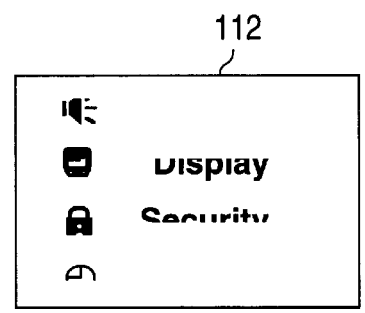
Figure 15:
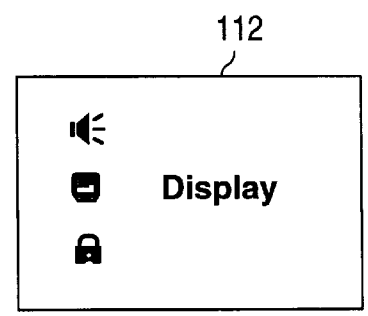

Referring to FIGS. 13–15, there is shown a conceptual scheme of scrolling menu items on display region 112 in response to the position changes of the start and end pointers 226 and 228 shown in FIG. 10, in accordance with the present invention.

In the example shown in FIGS. 13–15, it is assumed that the user is turning down the jog dial wheel 108, so that the start pointer 226 is moving from the second menu item (Display) to the first menu item (Sounds), and the end pointer 228 is moving from the fourth menu item (Timer) to the third menu item (Security).

As shown in FIG. 11, the start pointer 226 is mapped with the top edge 316, and the end pointer 228 with the bottom edge 318, of the window height 308 (see FIG. 4). Therefore, moving the start pointer and end pointer 226 and 228 up is equivalent to slide the paper 1002 up while keeping the paper 304 in a fixed position. Thus, when the start pointer 226 is moving from the second menu item (Display) to the first menu item (Sounds) and the end pointer 226 is moving from the fourth item (Timer) to the third menu item (Security), the following events will occur on the "T" shaped window 314:

(1) the icon field of the Timer menu item entry is moving out the column window 312;

(2) the icon field of the Sounds menu item entry is moving into the column window 312;

(3) the menu item field of the Security menu item entry is moving out the row window 314; and (4) the menu item field of the Display menu item entry is moving into the row window 314.

FIG. 14 shows a transitional display on the display region 112, while the start pointer 226 is moving from the second menu item entry (Security) to the first menu item entry (Display) and end pointer 228 is moving from the fourth menu item entry (Timer) to the third menu item entry (Security).

FIG. 15 shows a display on the display region 112, where the second menu item entry (Display) is moved into the row window 314.

In the menu item output buffer 213 shown FIG. 10, each of the menu items associates with a sub menu containing a plurality of sub menu items. In operation, a user can activate the menu item displayed on the display screen 112 by pressing in the jog dial wheel 108. In response to the activation, the processor 204 excuses the display routine (stored in the application memory 220) to display the sub menu that is associated with the activated menu item. The user can operate the cellular telephone 100 by pressing in the jog dial wheel 108 to activate the sub menu items. Specifically, the menu item "Sounds" associates with a sub menu for setting up the sound quality of the cellular telephone 100. The menu item "Security" associates with a sub menu for setting up security features (such as password access) for the cellular telephone 110. The menu item "Timer" associates with a sub menu for setting up time (hour:minute:day) for the cellular telephone 100.

The principle described in the above embodiments can be readily applied to a pop-up window on a PC screen, where the pop-up window displays a symbol (such as an icon) beside each of the content items.

Although the present invention has been shown and described with respect to preferred embodiments, various changes and modifications are deemed to lie within the spirit and scope of the invention as claimed.

What is claimed is:

1. A method for displaying a plurality of rows of items on a display region, each of the rows containing a content field and a symbol field, the method comprising the steps of:
   (a) displaying a column window and a row window on the display region;
   (b) scrolling the plurality of rows over the region, so that a set of symbol fields contained in a set of the plurality of rows are being scrolled into the column window and one and only one content field contained in the plurality of rows is being scrolled into the row window;
   (c) in the column window, displaying the symbol fields that are scrolled into the column window; and
   (d) in the row window, displaying the one content field that is being scrolled into the row window.

2. The method of 1, wherein each of the symbol fields displayed in the column window contains an item number.

3. The method of 1, wherein each of the symbol fields displayed in the column window contains an icon.

4. The method of claim 1,
   wherein the display region is located on an electronic device; and
   wherein the content field displayed in the row window can be selected to invoke an application to operate the electronic device.

5. The method of claim 1,
   wherein the display region is deployed on a telephone;
   wherein the plurality of rows contain a telephone directory containing a plurality of names, each of the names being associated with a plurality of telephone numbers;
   wherein each of the content fields contains a name; and
   wherein the name displayed in the row window can be selected to further display the plurality of the telephone numbers associated with the selected name.

6. The method of claim 5, further comprising the step of:
   selecting one of the telephone numbers to cause a dial signal to the selected telephone number.

7. The method of claim 1,
   wherein the display region is deployed on a telephone;
   wherein the plurality of rows contain a telephone directory containing a plurality of names, each of the names being associated with a telephone number;
   wherein each of the content fields contains name; and
   wherein the name displayed in the row window can be selected to cause a dial signal to the telephone number.

8. The method of claim 1,
   wherein the display region is deployed on an electronic device;
   wherein the plurality of rows contain a menu containing a plurality of menu items;
   wherein each of the content fields contains a menu item;
   wherein each of the symbol field contains an icon; and
   wherein the menu item displayed in the row window can be selected to operate the electronic device.

9. An apparatus for displaying a plurality of rows of items on a display region, each of the rows containing a content field and a symbol field, the apparatus comprising:
   (a) means for displaying a column window and a row window on the display region;
   (b) means for scrolling the plurality of rows over the region, so that a set of symbol fields contained in a set of the plurality of rows are being scrolled into the column window and one and only one content field contained in the plurality of rows is being scrolled into the row window;
   (c) means for displaying, in the column window, the symbol fields that are scrolled into the column window; and
   (d) means for displaying, in the row window, the one content field that is being scrolled into the row window.

10. The apparatus of 9, wherein each of the symbol fields displayed in the column window contains an item number.

11. The apparatus of 9, wherein each of the symbol fields displayed in the column window contains an icon.

12. The apparatus of claim 9, wherein the display region is located on an electronic device, the apparatus further comprising:
   means for selecting the content field displayed in the row window to invoke an application to operate the electronic device.

13. The apparatus of claim 9,
   wherein the display region is deployed on a telephone;
   wherein the plurality of rows contain a telephone directory containing a plurality of names, each of the names being associated with a plurality of telephone numbers;
   wherein each of the content fields contains a name; and
   wherein the apparatus further comprising:
      means for selecting the name displayed in the row window to further display the plurality of the telephone numbers associated with the selected name.

14. The apparatus of claim 13, further comprising:
   means for selecting one of the telephone numbers to cause a dial signal to the selected telephone number.

15. The apparatus of claim 9, wherein the display region is deployed on a telephone;

wherein the plurality of rows contain a telephone directory containing a plurality of names, each of the names being associated with a telephone number;

wherein each of the content fields contains name; and wherein the apparatus further comprising:

means for selecting the name displayed in the row window to cause a dial signal to the telephone number.

16. The apparatus of claim 9, wherein the display region is deployed on an electronic device;

wherein the plurality of rows contain a menu containing a plurality of menu items;

wherein each of the content fields contains a menu item;

wherein each of the symbol field contains an icon; and wherein the apparatus further comprising:

means for selecting the menu item displayed in the row window to operate the electronic device.

17. A method for displaying a plurality of rows of items on a display region, each of the rows containing a content field and a symbol field, the method comprising the steps of:

(a) displaying a column window and a row window on the display region;

(b) scrolling the plurality of rows over the region, so that a set of symbol fields contained in a set of the plurality of rows are being scrolled into the column window and at least one content field contained in the plurality of rows is being scrolled into the row window;

(c) in the column window, displaying the symbol fields that are scrolled into the column window; and (d) in the row window, displaying the content field that is being scrolled into the row window wherein the number of content fields displayed in the row window is fewer than the number of symbol fields displayed in the column window.

18. An apparatus for displaying a plurality of rows of items on a display region, each of the rows containing a content field and a symbol field, the apparatus comprising:

(a) means for displaying a column window and a row window on the display region;

(b) means for scrolling the plurality of rows over the region, so that a set of symbol fields contained in a set of the plurality of rows are being scrolled into the column window and at least one content field contained in the plurality of rows is being scrolled into the row window;

(c) means for displaying, in the column window, the symbol fields that are scrolled into the column window; and (d) means for displaying, in the row window, the content field that is being scrolled into the row window wherein the number of content fields displayed in the row window is fewer than the number of symbol fields displayed in the column window.

\* \* \* \* \*